(12) United States Patent
Culley et al.

(10) Patent No.: US 10,605,512 B2
(45) Date of Patent: Mar. 31, 2020

(54) METHOD OF WARMING A MOLD APPARATUS

(71) Applicant: WHIRLPOOL CORPORATION, Benton Harbor, MI (US)

(72) Inventors: Brian K. Culley, Evansville, IN (US); Lindsey Ann Wohlgamuth, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 442 days.

(21) Appl. No.: 15/280,376

(22) Filed: Sep. 29, 2016

(65) Prior Publication Data

US 2017/0016663 A1 Jan. 19, 2017

Related U.S. Application Data

(62) Division of application No. 13/713,176, filed on Dec. 13, 2012, now Pat. No. 9,470,448.

(51) Int. Cl.
*F25C 1/00* (2006.01)
*F25C 5/00* (2018.01)
(Continued)

(52) U.S. Cl.
CPC .................. *F25C 1/22* (2013.01); *F25C 1/04* (2013.01); *F25C 1/18* (2013.01); *F25C 5/08* (2013.01);
(Continued)

(58) Field of Classification Search
CPC .......... F25C 1/10; F25C 5/02; F25C 2300/00; F25C 2301/00; F25C 2305/022;
(Continued)

(56) References Cited

U.S. PATENT DOCUMENTS

| 275,192 A | 4/1883 | Goodell |
| 286,604 A | 10/1883 | Goodell |

(Continued)

FOREIGN PATENT DOCUMENTS

| AU | 2006201786 A1 | 11/2007 |
| CN | 1989379 A | 6/2007 |

(Continued)

OTHER PUBLICATIONS

"Manufacturing Processes—Explosive Sheetmetal Forming," Engineer's Handbook, 2006, web archive, last accessed Jan. 19, 2016, at http://www.engineershandbook.com/MfgMethods/exforming.htm, pp. 1-3.

(Continued)

*Primary Examiner* — Linda L Gray
(74) *Attorney, Agent, or Firm* — Price Heneveld LLP

(57) ABSTRACT

A method of releasing ice from a mold apparatus is disclosed which includes the steps of: providing a mold apparatus having a first mold portion including a concave depression and a liquid circulating manifold and a second mold portion having a concave depression; pivotally coupling to the first mold portion to the second mold portion such that the mold apparatus is operable between an ice forming position and an ice harvesting position; assembling the mold apparatus to the ice forming position such that the concave depressions abut to from a mold cavity; injecting water into the mold cavity; cooling the mold apparatus; forming at least one ice structure within the mold cavity; circulating a warm liquid medium in the liquid circulating manifold to warm the mold apparatus; disassembling the mold apparatus to the ice harvesting position; and releasing the at least one ice structure from the mold apparatus.

17 Claims, 2 Drawing Sheets

(51) Int. Cl.
*B29C 35/00* (2006.01)
*B29C 31/00* (2006.01)
*F25C 3/00* (2006.01)
*B29C 33/00* (2006.01)
*F25C 1/22* (2018.01)
*F25C 1/18* (2006.01)
*F25C 5/10* (2006.01)
*F25C 1/04* (2018.01)
*F25C 5/08* (2006.01)
*B29C 35/04* (2006.01)
*F25C 5/14* (2006.01)
*B29C 31/04* (2006.01)
*F25C 1/08* (2006.01)
*B29C 33/04* (2006.01)
*F25C 1/25* (2018.01)

(52) U.S. Cl.
CPC ............... *F25C 5/10* (2013.01); *B29C 31/04* (2013.01); *B29C 33/04* (2013.01); *B29C 35/041* (2013.01); *F25C 1/08* (2013.01); *F25C 1/25* (2018.01); *F25C 3/00* (2013.01); *F25C 5/00* (2013.01); *F25C 5/14* (2013.01)

(58) Field of Classification Search
CPC .......... F25C 2400/06; F25C 5/08; F25C 1/22; A23G 9/083; A23G 9/221; B29C 31/04; B29C 33/04; B29C 35/041
See application file for complete search history.

(56) References Cited

U.S. PATENT DOCUMENTS

| | | |
|---|---|---|
| 301,539 A | 7/1884 | Vezin |
| 1,407,614 A | 2/1922 | Wicks |
| 1,616,492 A | 2/1927 | Lado |
| 1,889,481 A | 11/1932 | Kennedy, Jr. |
| 1,932,731 A | 10/1933 | Hathorne |
| 2,027,754 A | 1/1936 | Smith |
| 2,083,081 A * | 6/1937 | Moll .................... A23G 9/083 249/120 |
| 2,244,081 A | 3/1938 | Reeves |
| 2,617,269 A | 6/1949 | Smith-Johannsen |
| 2,481,525 A | 9/1949 | Mott |
| 2,757,519 A | 2/1954 | Sampson |
| 2,846,854 A | 2/1954 | Galin |
| 2,683,356 A | 7/1954 | Green, Jr. |
| 2,878,659 A | 7/1955 | Prance et al. |
| 2,942,432 A | 6/1960 | Muffly |
| 2,969,654 A | 1/1961 | Harte |
| 2,996,895 A | 8/1961 | Lippincott |
| 3,009,336 A | 11/1961 | Bayston et al. |
| 3,016,719 A | 1/1962 | Reindl |
| 3,033,008 A | 5/1962 | Davis |
| 3,046,753 A | 7/1962 | Carapico, Jr. |
| 3,071,933 A | 1/1963 | Shoemaker |
| 3,075,360 A | 1/1963 | Elfving et al. |
| 3,075,364 A | 1/1963 | Kniffin |
| 3,084,678 A | 4/1963 | Lindsay |
| 3,084,878 A | 4/1963 | Helming et al. |
| 3,093,980 A | 6/1963 | Frei |
| 3,144,755 A | 8/1964 | Kattis |
| 3,159,985 A | 12/1964 | Keighley |
| 3,172,269 A | 3/1965 | Cole |
| 3,192,726 A | 7/1965 | Newton |
| 3,200,600 A | 8/1965 | Elfving |
| 3,214,128 A | 10/1965 | Beck et al. |
| 3,217,508 A | 11/1965 | Beck et al. |
| 3,217,510 A | 11/1965 | Kniffin et al. |
| 3,217,511 A | 11/1965 | Keighley |
| 3,222,902 A | 12/1965 | Brejcha et al. |
| 3,228,222 A | 1/1966 | Maier |
| 3,255,603 A | 6/1966 | Johnson et al. |
| 3,306,064 A | 2/1967 | Poolos |
| 3,308,631 A | 3/1967 | Kniffin |
| 3,318,105 A | 5/1967 | Burroughs et al. |
| 3,321,932 A | 5/1967 | Orphey, Jr. |
| 3,383,876 A | 5/1968 | Frohbieter |
| 3,412,572 A | 11/1968 | Kesling |
| 3,426,564 A | 2/1969 | Jansen et al. |
| 3,451,237 A | 6/1969 | Baringer et al. |
| 3,596,477 A | 8/1971 | Harley |
| 3,638,451 A | 2/1972 | Brandt |
| 3,646,792 A | 3/1972 | Hertel et al. |
| 3,648,964 A | 3/1972 | Fox |
| 3,677,030 A | 7/1972 | Nicholas |
| 3,684,235 A | 8/1972 | Schupbach |
| 3,775,992 A | 12/1973 | Bright |
| 3,788,089 A | 1/1974 | Graves |
| 3,806,077 A | 4/1974 | Pietrzak et al. |
| 3,864,933 A | 2/1975 | Bright |
| 3,892,105 A | 7/1975 | Bernard |
| 3,908,395 A | 9/1975 | Hobbs |
| 3,952,539 A | 4/1976 | Hanson et al. |
| 4,006,605 A | 2/1977 | Dickson et al. |
| D244,275 S | 5/1977 | Gurbin |
| 4,024,744 A | 5/1977 | Trakhtenberg et al. |
| 4,059,970 A | 11/1977 | Loeb |
| 4,062,201 A | 12/1977 | Schumacher et al. |
| 4,078,450 A | 3/1978 | Vallejos |
| D249,269 S | 9/1978 | Pitts |
| 4,142,378 A | 3/1979 | Bright et al. |
| 4,148,457 A | 4/1979 | Gurbin |
| 4,184,339 A | 1/1980 | Wessa |
| 4,222,547 A | 9/1980 | Lalonde |
| 4,261,182 A | 4/1981 | Elliott |
| 4,288,497 A | 9/1981 | Tanaka et al. |
| 4,402,185 A | 9/1983 | Perchak |
| 4,402,194 A | 9/1983 | Kuwako et al. |
| 4,412,429 A | 11/1983 | Kohl |
| 4,462,345 A | 7/1984 | Routery |
| 4,483,153 A | 11/1984 | Wallace |
| 4,487,024 A | 12/1984 | Fletcher et al. |
| 4,550,575 A | 11/1985 | DeGaynor |
| 4,562,991 A | 1/1986 | Wu |
| 4,587,810 A | 5/1986 | Fletcher |
| 4,627,946 A | 12/1986 | Crabtree |
| 4,628,699 A | 12/1986 | Mawby et al. |
| 4,669,271 A | 6/1987 | Noel |
| 4,680,943 A | 7/1987 | Mawby et al. |
| 4,685,304 A | 8/1987 | Essig |
| 4,688,386 A | 8/1987 | Lane et al. |
| 4,727,720 A | 3/1988 | Wernicki |
| 4,843,827 A | 7/1989 | Peppers |
| 4,852,359 A | 8/1989 | Manzotti |
| 4,856,463 A | 8/1989 | Johnston |
| 4,910,974 A | 3/1990 | Hara |
| 4,942,742 A * | 7/1990 | Burruel .................... F25C 1/04 249/119 |
| 4,970,877 A | 11/1990 | Dimijian |
| 4,971,737 A | 11/1990 | Infanti |
| 5,025,756 A | 6/1991 | Nyc |
| D318,281 S | 7/1991 | McKinlay |
| 5,044,600 A | 9/1991 | Shannon |
| 5,129,237 A | 7/1992 | Day et al. |
| 5,157,929 A | 10/1992 | Hotaling |
| 5,177,980 A | 1/1993 | Kawamoto et al. |
| 5,196,127 A | 3/1993 | Solell |
| 5,253,487 A | 10/1993 | Oike |
| 5,257,601 A | 11/1993 | Coffin |
| 5,272,888 A | 12/1993 | Fisher et al. |
| 5,372,492 A | 12/1994 | Yamauchi |
| 5,378,521 A | 1/1995 | Ogawa et al. |
| 5,400,605 A | 3/1995 | Jeong |
| 5,408,844 A | 4/1995 | Stokes |
| 5,425,243 A | 6/1995 | Sanuki et al. |
| 5,483,929 A | 1/1996 | Kuhn et al. |
| 5,586,439 A | 12/1996 | Schlosser et al. |
| 5,617,728 A | 4/1997 | Kim et al. |
| 5,632,936 A | 5/1997 | Su et al. |
| 5,618,463 A | 8/1997 | Rindler et al. |
| 5,675,975 A | 10/1997 | Lee |
| 5,761,920 A | 6/1998 | Wilson et al. |

(56) References Cited

U.S. PATENT DOCUMENTS

| | | |
|---|---|---|
| 5,768,900 A | 6/1998 | Lee |
| 5,826,320 A | 10/1998 | Rathke et al. |
| 5,884,487 A | 3/1999 | Davis et al. |
| 5,884,490 A | 3/1999 | Whidden |
| D415,505 S | 10/1999 | Myers |
| 5,970,725 A | 10/1999 | Lee |
| 5,970,735 A | 10/1999 | Hobelsberger |
| 6,058,720 A | 5/2000 | Ryu |
| 6,062,036 A | 5/2000 | Hobelsberger |
| 6,082,130 A | 7/2000 | Pastryk et al. |
| 6,101,817 A | 8/2000 | Watt |
| 6,145,320 A | 11/2000 | Kim |
| 6,148,620 A | 11/2000 | Kumagai et al. |
| 6,148,621 A | 11/2000 | Byczynski et al. |
| 6,161,390 A | 12/2000 | Kim |
| 6,179,045 B1 | 1/2001 | Lilleaas |
| 6,209,849 B1 | 4/2001 | Dickmeyer |
| 6,282,909 B1 | 9/2001 | Newman et al. |
| 6,289,683 B1 | 9/2001 | Daukas et al. |
| 6,357,720 B1 | 3/2002 | Shapiro et al. |
| 6,425,259 B2 | 7/2002 | Nelson et al. |
| 6,427,463 B1 | 8/2002 | James |
| 6,438,988 B1 | 8/2002 | Paskey |
| 6,467,146 B1 | 10/2002 | Herman |
| 6,481,235 B2 | 11/2002 | Kwon |
| 6,488,463 B1 | 12/2002 | Harris |
| 6,647,739 B1 | 11/2003 | Kim et al. |
| 6,688,130 B1 | 2/2004 | Kim |
| 6,688,131 B1 | 2/2004 | Kim et al. |
| 6,735,959 B1 | 5/2004 | Najewicz |
| 6,742,351 B2 | 6/2004 | Kim et al. |
| 6,763,787 B2 | 7/2004 | Hallenstvedt et al. |
| 6,782,706 B2 | 8/2004 | Holmes et al. |
| D496,374 S | 9/2004 | Zimmerman |
| 6,817,200 B2 | 11/2004 | Willamor et al. |
| 6,820,433 B2 | 11/2004 | Hwang |
| 6,823,689 B2 | 11/2004 | Kim et al. |
| 6,857,277 B2 | 2/2005 | Somura |
| 6,935,124 B2 | 8/2005 | Takahashi et al. |
| 6,951,113 B1 | 10/2005 | Adamski |
| D513,019 S | 12/2005 | Lion et al. |
| 7,010,934 B2 | 3/2006 | Choi et al. |
| 7,010,937 B2 | 3/2006 | Wilkinson et al. |
| 7,013,654 B2 | 3/2006 | Tremblay et al. |
| 7,051,541 B2 | 5/2006 | Chung et al. |
| 7,059,140 B2 | 6/2006 | Zevlakis |
| 7,062,925 B2 | 6/2006 | Tsuchikawa et al. |
| 7,062,936 B2 | 6/2006 | Rand et al. |
| 7,082,782 B2 | 8/2006 | Schlosser et al. |
| 7,131,280 B2 | 11/2006 | Voglewede et al. |
| 7,185,508 B2 | 3/2007 | Voglewede et al. |
| 7,188,479 B2 | 3/2007 | Anselmino et al. |
| 7,201,014 B2 | 4/2007 | Hornung |
| 7,204,092 B2 | 4/2007 | Castellón et al. |
| 7,210,298 B2 | 5/2007 | Lin |
| 7,216,490 B2 | 5/2007 | Joshi |
| 7,216,491 B2 | 5/2007 | Cole et al. |
| 7,234,423 B2 | 6/2007 | Lindsay |
| 7,266,973 B2 | 9/2007 | Anderson et al. |
| 7,297,516 B2 | 11/2007 | Chapman et al. |
| 7,318,323 B2 | 1/2008 | Tatsui et al. |
| 7,386,993 B2 | 6/2008 | Castellón et al. |
| 7,415,833 B2 | 8/2008 | Leaver et al. |
| 7,448,863 B2 | 11/2008 | Yang |
| 7,464,565 B2 | 12/2008 | Fu |
| 7,469,553 B2 | 12/2008 | Wu et al. |
| 7,487,645 B2 | 2/2009 | Sasaki et al. |
| 7,568,359 B2 | 8/2009 | Wetekamp et al. |
| 7,587,905 B2 | 9/2009 | Kopf |
| 7,669,435 B2 | 3/2010 | Joshi |
| 7,681,406 B2 | 3/2010 | Cushman et al. |
| 7,703,292 B2 | 4/2010 | Cook et al. |
| 7,744,173 B2 | 6/2010 | Maglinger et al. |
| 7,752,859 B2 | 7/2010 | Lee et al. |
| 7,762,092 B2 | 7/2010 | Tikhonov et al. |
| 7,770,985 B2 | 8/2010 | Davis et al. |
| 7,802,457 B2 | 9/2010 | Golovashchenko et al. |
| 7,832,227 B2 | 11/2010 | Wu et al. |
| 7,866,167 B2 | 1/2011 | Kopf |
| 7,870,755 B2 | 1/2011 | Hsu et al. |
| 7,918,105 B2 | 4/2011 | Kim |
| 7,963,120 B2 | 6/2011 | An et al. |
| 8,015,849 B2 | 9/2011 | Jones et al. |
| 8,037,697 B2 | 10/2011 | LeClear et al. |
| 8,074,464 B2 | 12/2011 | Venkatakrishnan et al. |
| 8,099,989 B2 | 1/2012 | Bradley et al. |
| 8,104,304 B2 | 1/2012 | Kang et al. |
| 8,117,863 B2 | 2/2012 | Van Meter et al. |
| 8,171,744 B2 | 5/2012 | Watson et al. |
| 8,281,613 B2 | 10/2012 | An et al. |
| 8,322,148 B2 | 12/2012 | Kim et al. |
| 8,336,327 B2 | 12/2012 | Cole et al. |
| 8,371,133 B2 | 2/2013 | Kim et al. |
| 8,371,136 B2 | 2/2013 | Venkatakrishnan et al. |
| 8,375,739 B2 | 2/2013 | Kim et al. |
| 8,375,919 B2 | 2/2013 | Cook et al. |
| 8,408,023 B2 | 4/2013 | Shin et al. |
| 8,413,619 B2 | 4/2013 | Cleeves |
| 8,424,334 B2 | 4/2013 | Kang et al. |
| 8,429,926 B2 | 4/2013 | Shaha et al. |
| 8,438,869 B2 | 5/2013 | Kim et al. |
| 8,474,279 B2 | 7/2013 | Besore et al. |
| 8,516,835 B2 | 8/2013 | Holter |
| 8,516,846 B2 | 8/2013 | Lee et al. |
| 8,555,658 B2 | 10/2013 | Kim et al. |
| 8,616,018 B2 | 12/2013 | Jeong et al. |
| 8,646,283 B2 | 2/2014 | Kuratani et al. |
| 8,677,774 B2 | 3/2014 | Yamaguchi et al. |
| 8,677,776 B2 | 3/2014 | Kim et al. |
| 8,707,726 B2 | 4/2014 | Lim et al. |
| 8,746,204 B2 | 6/2014 | Hofbauer |
| 8,756,952 B2 | 6/2014 | Adamski et al. |
| 8,769,981 B2 | 7/2014 | Hong et al. |
| 8,820,108 B2 | 9/2014 | Oh et al. |
| 8,893,523 B2 | 11/2014 | Talegaonkar et al. |
| 8,925,335 B2 | 1/2015 | Gooden et al. |
| 8,943,852 B2 | 2/2015 | Lee et al. |
| 9,021,828 B2 | 5/2015 | Vitan et al. |
| 9,127,873 B2 | 9/2015 | Tarr et al. |
| 9,175,896 B2 | 11/2015 | Choi |
| 9,217,595 B2 | 12/2015 | Kim et al. |
| 9,217,596 B2 | 12/2015 | Hall |
| 9,228,769 B2 | 1/2016 | Kim et al. |
| 9,476,631 B2 | 10/2016 | Park et al. |
| 9,829,235 B2 | 11/2017 | Visin |
| 9,879,896 B2 | 1/2018 | Koo |
| 2002/0014087 A1 | 2/2002 | Kwon |
| 2003/0111028 A1 | 6/2003 | Hallenstvedt |
| 2004/0099004 A1 | 5/2004 | Somura |
| 2004/0144100 A1 | 7/2004 | Hwang |
| 2004/0206250 A1 | 10/2004 | Kondou et al. |
| 2004/0237566 A1 | 12/2004 | Hwang |
| 2004/0261427 A1 | 12/2004 | Tsuchikawa et al. |
| 2005/0067406 A1 | 3/2005 | Rajarajan et al. |
| 2005/0126185 A1 | 6/2005 | Joshi |
| 2005/0126202 A1 | 6/2005 | Shoukyuu et al. |
| 2005/0151050 A1 | 7/2005 | Godfrey |
| 2005/0160741 A1 | 7/2005 | Park |
| 2005/0160757 A1 | 7/2005 | Choi et al. |
| 2006/0016209 A1 | 1/2006 | Cole et al. |
| 2006/0032262 A1 | 2/2006 | Seo et al. |
| 2006/0053805 A1 | 3/2006 | Flinner et al. |
| 2006/0086107 A1 | 4/2006 | Voglewede et al. |
| 2006/0086134 A1 | 4/2006 | Voglewede et al. |
| 2006/0150645 A1 | 7/2006 | Leaver |
| 2006/0168983 A1 | 8/2006 | Tatsui et al. |
| 2006/0207282 A1 | 9/2006 | Visin et al. |
| 2006/0225457 A1 | 10/2006 | Hallin |
| 2006/0233925 A1 | 10/2006 | Kawamura |
| 2006/0242971 A1 | 11/2006 | Cole et al. |
| 2006/0288726 A1 | 12/2006 | Mori et al. |
| 2007/0028866 A1 | 2/2007 | Lindsay |
| 2007/0107447 A1 | 5/2007 | Langlotz |
| 2007/0119202 A1 | 5/2007 | Kadowaki et al. |

(56) References Cited

U.S. PATENT DOCUMENTS

| | | |
|---|---|---|
| 2007/0130983 A1 | 6/2007 | Broadbent et al. |
| 2007/0137241 A1 | 6/2007 | Lee et al. |
| 2007/0193278 A1 | 8/2007 | Polacek et al. |
| 2007/0227162 A1 | 10/2007 | Wang |
| 2007/0227164 A1 | 10/2007 | Ito et al. |
| 2007/0262230 A1 | 11/2007 | McDermott |
| 2008/0034780 A1 | 2/2008 | Lim et al. |
| 2008/0104991 A1 | 5/2008 | Hoehne et al. |
| 2008/0145631 A1 | 6/2008 | Bhate et al. |
| 2008/0236187 A1 | 10/2008 | Kim |
| 2008/0264082 A1 | 10/2008 | Tikhonov et al. |
| 2008/0289355 A1 | 11/2008 | Kang et al. |
| 2009/0049858 A1 | 2/2009 | Lee et al. |
| 2009/0120306 A1 | 5/2009 | DeCarlo et al. |
| 2009/0165492 A1 | 7/2009 | Wilson et al. |
| 2009/0173089 A1 | 7/2009 | LeClear et al. |
| 2009/0178428 A1 | 7/2009 | Cho et al. |
| 2009/0178430 A1 | 7/2009 | Jendrusch et al. |
| 2009/0187280 A1 | 7/2009 | Hsu et al. |
| 2009/0199569 A1 | 8/2009 | Petrenko |
| 2009/0211266 A1 | 8/2009 | Kim et al. |
| 2009/0211271 A1 | 8/2009 | Kim et al. |
| 2009/0223230 A1 | 9/2009 | Kim et al. |
| 2009/0235674 A1 | 9/2009 | Kern et al. |
| 2009/0272259 A1 | 11/2009 | Cook et al. |
| 2009/0308085 A1 | 12/2009 | DeVos |
| 2010/0011827 A1 | 1/2010 | Stoeger et al. |
| 2010/0018226 A1 | 1/2010 | Kim et al. |
| 2010/0031675 A1 | 2/2010 | Kim et al. |
| 2010/0043455 A1 | 2/2010 | Kuehl et al. |
| 2010/0050663 A1 | 3/2010 | Venkatakrishnan et al. |
| 2010/0050680 A1 | 3/2010 | Venkatakrishnan et al. |
| 2010/0055223 A1 | 3/2010 | Kondou et al. |
| 2010/0095692 A1 | 4/2010 | Jendrusch et al. |
| 2010/0101254 A1 | 4/2010 | Besore et al. |
| 2010/0126185 A1 | 5/2010 | Cho et al. |
| 2010/0139295 A1 | 6/2010 | Zuccolo et al. |
| 2010/0163707 A1 | 7/2010 | Kim |
| 2010/0180608 A1 | 7/2010 | Shaha et al. |
| 2010/0197849 A1 | 8/2010 | Momose et al. |
| 2010/0218518 A1 | 9/2010 | Ducharme et al. |
| 2010/0218540 A1 | 9/2010 | McCollough et al. |
| 2010/0218542 A1 | 9/2010 | McCollough et al. |
| 2010/0251730 A1 | 10/2010 | Whillock, Sr. |
| 2010/0257888 A1 | 10/2010 | Kang et al. |
| 2010/0293969 A1 | 11/2010 | Braithwaite et al. |
| 2010/0313594 A1 | 12/2010 | Lee et al. |
| 2010/0319367 A1 | 12/2010 | Kim et al. |
| 2010/0326093 A1 | 12/2010 | Watson et al. |
| 2011/0005263 A1 | 1/2011 | Yamaguchi et al. |
| 2011/0023502 A1 | 2/2011 | Ito et al. |
| 2011/0062308 A1 | 3/2011 | Hammond et al. |
| 2011/0146312 A1 | 6/2011 | Hong et al. |
| 2011/0192175 A1 | 8/2011 | Kuratani et al. |
| 2011/0214447 A1 | 9/2011 | Bortoletto et al. |
| 2011/0239686 A1 | 10/2011 | Zhang et al. |
| 2011/0265498 A1 | 11/2011 | Hall |
| 2012/0007264 A1 | 1/2012 | Kondou et al. |
| 2012/0011868 A1 | 1/2012 | Kim et al. |
| 2012/0023996 A1 | 2/2012 | Herrera et al. |
| 2012/0047918 A1 | 3/2012 | Herrera et al. |
| 2012/0073538 A1 | 3/2012 | Hofbauer |
| 2012/0085302 A1 | 4/2012 | Cleeves |
| 2012/0174613 A1 | 7/2012 | Park et al. |
| 2012/0240613 A1 | 9/2012 | Saito et al. |
| 2012/0291473 A1 | 11/2012 | Krause et al. |
| 2013/0081412 A1* | 4/2013 | Son ................... F25C 1/04 62/73 |
| 2015/0330678 A1 | 11/2015 | Hu |
| 2016/0370078 A1 | 12/2016 | Koo |
| 2017/0051966 A1 | 2/2017 | Powell |
| 2017/0074527 A1 | 3/2017 | Visin |
| 2017/0191722 A1 | 7/2017 | Bertolini et al. |
| 2017/0292748 A1 | 10/2017 | Gullett |
| 2017/0314841 A1 | 11/2017 | Koo et al. |
| 2017/0343275 A1 | 11/2017 | Kim |
| 2018/0017309 A1 | 1/2018 | Miller et al. |

FOREIGN PATENT DOCUMENTS

| | | |
|---|---|---|
| CN | 102353193 A | 9/2011 |
| DE | 202006012499 U1 | 10/2006 |
| DE | 102008042910 A1 | 4/2010 |
| DE | 102009046030 | 4/2011 |
| EP | 1653171 | 5/2006 |
| EP | 1710520 A2 | 11/2006 |
| EP | 1821051 A1 | 8/2007 |
| EP | 2078907 A2 | 7/2009 |
| EP | 2375200 | 10/2011 |
| EP | 2660541 | 11/2013 |
| EP | 2743606 A2 | 6/2014 |
| EP | 2743608 A2 | 6/2014 |
| FR | 2771159 A1 | 5/1999 |
| GB | 657353 | 9/1951 |
| GB | 2139337 A | 11/1984 |
| JP | S489460 | 2/1973 |
| JP | S5278848 | 6/1977 |
| JP | S60141239 A | 7/1985 |
| JP | S6171877 U | 5/1986 |
| JP | 6435375 | 3/1989 |
| JP | H01196478 A | 8/1989 |
| JP | H01210778 A | 8/1989 |
| JP | H01310277 A | 12/1989 |
| JP | H024185 A | 1/1990 |
| JP | H0231649 A | 2/1990 |
| JP | H02143070 A | 6/1990 |
| JP | H03158670 A | 7/1991 |
| JP | H03158673 A | 7/1991 |
| JP | H0415069 A | 1/1992 |
| JP | H04161774 A | 6/1992 |
| JP | H4260764 A | 9/1992 |
| JP | H051870 A | 1/1993 |
| JP | H05248746 A | 9/1993 |
| JP | H05332562 A | 12/1993 |
| JP | H063005 A | 1/1994 |
| JP | H0611219 A | 1/1994 |
| JP | H06323704 A | 11/1994 |
| JP | H10227547 A | 8/1998 |
| JP | H10253212 A | 9/1998 |
| JP | H11223434 A | 8/1999 |
| JP | 2000039240 A | 2/2000 |
| JP | 2000346506 A | 12/2000 |
| JP | 2001041620 A | 2/2001 |
| JP | 2001041624 A | 2/2001 |
| JP | 2001221545 A | 8/2001 |
| JP | 2001355946 | 12/2001 |
| JP | 2002139268 A | 5/2002 |
| JP | 2002295934 A | 10/2002 |
| JP | 2002350019 A | 12/2002 |
| JP | 2003042612 A | 2/2003 |
| JP | 2003042621 A | 2/2003 |
| JP | 2003172564 A | 6/2003 |
| JP | 2003232587 A | 8/2003 |
| JP | 2003269830 A | 9/2003 |
| JP | 2003279214 A | 10/2003 |
| JP | 2003336947 A | 11/2003 |
| JP | 2004053036 A | 2/2004 |
| JP | 2004278894 A | 10/2004 |
| JP | 2004278990 A | 10/2004 |
| JP | 2005164145 A | 6/2005 |
| JP | 2005180825 A | 7/2005 |
| JP | 2005195315 A | 7/2005 |
| JP | 2005331200 A | 12/2005 |
| JP | 2006022980 A | 1/2006 |
| JP | 2006071247 A | 3/2006 |
| JP | 2006323704 A | 11/2006 |
| JP | 2007232336 A | 9/2007 |
| KR | 20010109256 | 12/2001 |
| KR | 20060013721 A | 2/2006 |
| KR | 20060126156 A | 12/2006 |
| KR | 100845860 B1 | 7/2008 |
| KR | 20090132283 A | 12/2009 |
| KR | 20100123089 A | 11/2010 |

(56) References Cited

FOREIGN PATENT DOCUMENTS

| KR | 20110037609 A | 4/2011 |
|---|---|---|
| RU | 2365832 | 8/2009 |
| SU | 1747821 A1 | 7/1992 |
| TW | 424878 U | 3/2001 |
| WO | 8808946 A1 | 11/1988 |
| WO | 2008052736 A1 | 5/2008 |
| WO | 2008056957 A2 | 5/2008 |
| WO | 2008061179 A2 | 5/2008 |
| WO | 2008143451 A1 | 11/2008 |
| WO | 2012002761 A2 | 1/2012 |
| WO | 2012023717 A2 | 2/2012 |
| WO | 2012025369 | 3/2012 |
| WO | 2017039334 A2 | 3/2017 |

OTHER PUBLICATIONS

"Nickel Alloys for Electronics," A Nickel Development Institute Reference Book, 1988, 131 pages, Series N 11 002, NiDI Nickel Development Institute.
Daehn, "High-Velocity Metal Forming," ASM Handbook, 2006, pp. 405-418, vol. 14B, ASM International.
Daehn, et al., "Hyperplacstic Forming: Process Potential and Factors Affecting Formability," MRS Proceedings, 1999, at p. 147, vol. 601.
Jimbert et al., "Flanging and Hemming of Auto Body Panels using the Electro Magnetic Forming technology," 3rd International Conference on High Speed Forming, 2008, pp. 163-172.
Shang et al., "Electromagnetically assisted sheet metal stamping," Journal of Materials Processing Technology, 2010, pp. 868-874, 211.
European Search Report dated Sep. 18, 2017, Application No. 13163180.6; 8 pages.

\* cited by examiner

METHOD OF WARMING A MOLD APPARATUS

CROSS-REFERENCE TO RELATED APPLICATIONS

This application is a divisional of and claims priority to U.S. patent application Ser. No. 13/713,176, now U.S. Pat. No. 9,470,448, filed Dec. 13, 2012, entitled METHOD TO WARM PLASTIC SIDE OF MOLD. The aforementioned related application is hereby incorporated herein by reference in its entirety.

The present application is related to, and hereby incorporates by reference, the entire disclosures of the following applications for United States Patents: U.S. patent application Ser. No. 13/713,126 entitled CLEAR ICE SPHERES, filed on Dec. 13, 2012, now U.S. Pat. No. 9,074,803; U.S. patent application Ser. No. 13/713,131 entitled MOLDED CLEAR ICE SPHERES, filed on Dec. 13, 2012, now U.S. Pat. No. 9,080,800; U.S. patent application Ser. No. 13/713,119 entitled CLEAR ICE HYBRID MOLD, filed on Dec. 13, 2012, now U.S. Pat. No. 9,074,802; and U.S. patent application Ser. No. 13/713,140 entitled MOLDED CLEAR ICE SPHERES, filed on Dec. 13, 2012, now U.S. Pat. No. 9,151,527.

FIELD OF THE INVENTION

The present invention generally relates to an ice mold apparatus for making substantially clear ice pieces, and methods of using the same.

SUMMARY OF THE INVENTION

According to one aspect of the present disclosure, a method of releasing ice from a mold apparatus, includes the steps of: providing a mold apparatus having a first mold portion including a concave depression and a liquid circulating manifold and a second mold portion having a concave depression; pivotally coupling to the first mold portion to the second mold portion such that the mold apparatus is operable between an ice forming position and an ice harvesting position; assembling the mold apparatus to the ice forming position such that the concave depressions abut to from a mold cavity; injecting water into the mold cavity; cooling the mold apparatus; forming at least one ice structure within the mold cavity; circulating a warm liquid medium in the liquid circulating manifold to warm the mold apparatus; disassembling the mold apparatus to the ice harvesting position; and releasing the at least one ice structure from the mold apparatus.

According to another aspect of the present disclosure, a method of releasing ice from a mold apparatus, including the steps of: providing a mold apparatus having a first mold portion including a liquid circulating manifold and a second mold portion; assembling the mold apparatus such that the first mold portion and the second mold portion are abuttingly engaged to create a mold cavity; injecting water into the mold cavity; cooling the mold apparatus; forming at least one ice structure within the mold cavity; and circulating a warm liquid medium in the liquid circulating manifold to warm the mold apparatus.

According to another aspect of the present disclosure, a method of releasing ice from a mold apparatus, including the steps of: providing a mold apparatus having a first mold portion including a liquid circulating manifold and a second mold portion; pivotally coupling the first mold portion to the second mold portion; assembling the mold apparatus such that the first mold portion and the second mold portion are abuttingly engaged to create a mold cavity; injecting water into the mold cavity; cooling the mold apparatus; forming at least one ice structure within the mold cavity; circulating a warm liquid medium in the liquid circulating manifold to warm the mold apparatus; disassembling the mold apparatus; and ejecting the ice structure from the mold apparatus using an ejector pin.

These and other features, advantages, and objects of the present invention will be further understood and appreciated by those skilled in the art by reference to the following specification, claims, and appended drawings.

DETAILED DESCRIPTION

For purposes of description herein, the aspects of this disclosure may assume various alternative orientations, except where expressly specified to the contrary. The specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
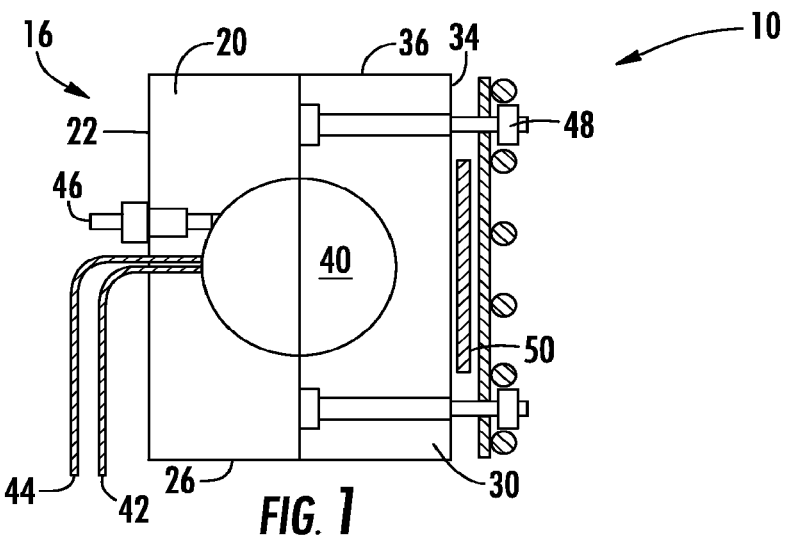
FIG. 1 is a side elevational view of an ice-producing mold in a closed position.

FIG. 1 generally illustrates an ice-producing mold 10 which includes a first mold portion 20 and a second mold portion 30. The first mold portion 20 is generally rectangular in shape and includes a top surface 22. The top surface 22 typically has at least one perimeter side wall 26, more commonly two perimeter side walls 26, which extend downwardly from the top surface 22. The first mold portion 20 of the mold 10 also has a bottom surface 24 which includes a concave depression 28. This depression 28 is typically formed in a semi-spherical shape and is centrally arranged on the bottom surface 24.

The mold 10 further includes has a second portion 30 which is operably coupled to the first mold portion 20. The second mold portion 30 includes a top surface 32 which has at least one, and preferably two, perimeter side walls 36 extending upwardly therefrom. Along with a bottom surface 34, the top surface 32 and perimeter side walls 36 form a generally rectangular shape of the second mold portion 30 as shown in FIG. 1. The top surface 32 of the second mold portion also includes a concave depression 38 which is typically semi-spherically shaped and reciprocal of the concave depression 28 of the first mold portion 20. The second mold portion 30 also includes a plurality of apertures which receive mounting fasteners 48 in order to mount the second mold portion 30 in an appliance, such as a freezer. The bottom surface 34 of the second mold portion is adapted to be in thermal communication with a cooling mechanism 50, typically an evaporator, in order to cool the mold 10.

Figure 2:
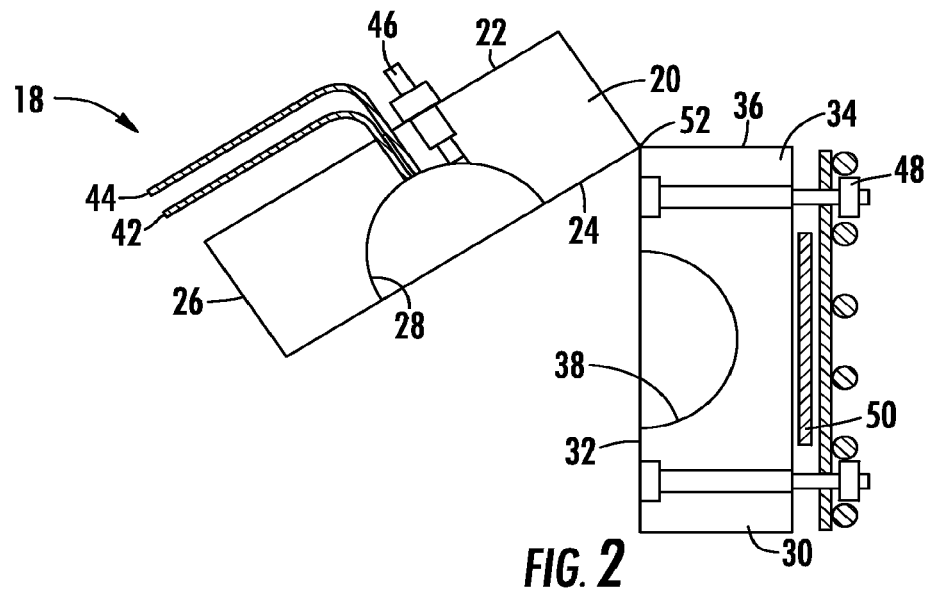
FIG. 2 is a side elevational view of the ice-producing mold of FIG. 1 in an open position.
Figure 3:
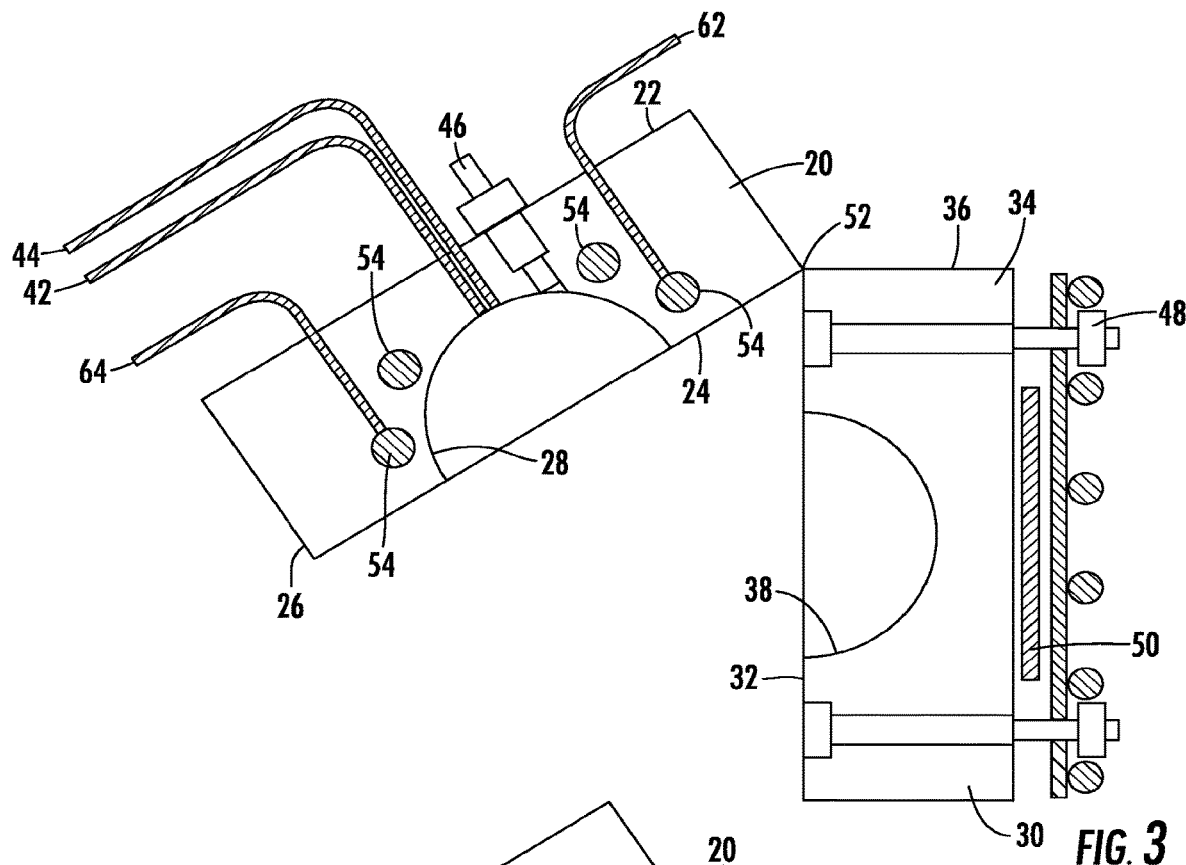
FIG. 3 is a side elevational view of another embodiment of an ice-producing mold in an open position.
Figure 4:
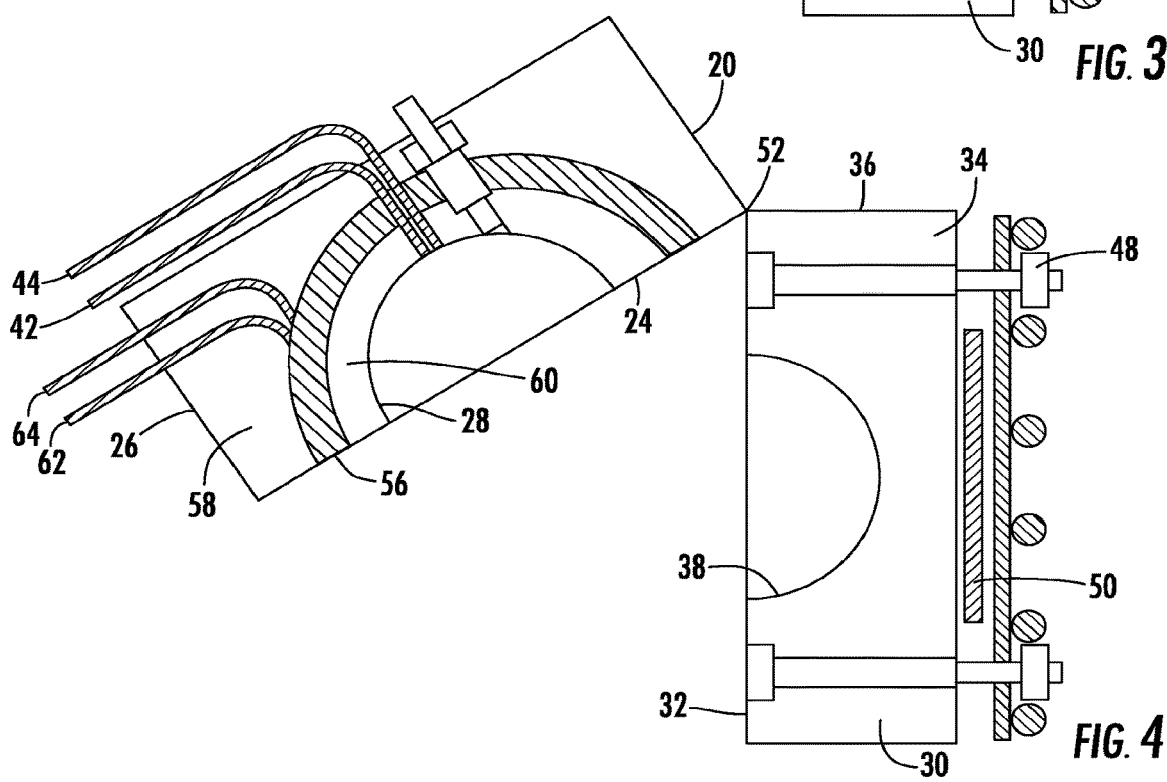
FIG. 4 is a side elevational view of another embodiment of an ice-producing mold in an open position.

The mold 10 is operable between a closed position 16, shown in FIG. 1, and an open position 18, shown in FIG. 2 as the first and second mold portions 20, 30 are generally operably coupled by a hinge member 52 (FIGS. 3 and 4). When the mold 10 is in the closed position 16, the bottom surface 24 of the first mold portion 20 abuts the top surface 32 of the second mold portion 30. Also, while in the closed position 16, at least one perimeter sidewall 26 of the first mold portion 20 and at least one perimeter sidewall 36 of the second mold portion 30 form a flat planar surface. In the closed position 16, the first mold portion 20 and the second mold portion 30, form a single rectangular mold 10. The mold 10 may also be of any other shape, including but not limited to spherical, cylindrical, cubical, or any other shape one with ordinary skill in the art would use to create specially shaped ice structures. While in the closed position 16, the concave depression 28 of the first mold portion 20 and the concave depression 38 of the second mold portion 30 are aligned and cooperate to define a mold cavity 40 which is adapted to form one or more ice structures therein. As shown in FIGS. 1-4, the mold cavity 40 is spherical in shape but may be star-shaped, heart-shaped, rectangular-shaped, triangular-shaped, or any other shape a user would desire.

Referring now to FIG. 2, when the mold 10 is in an open position 18, the bottom surface 24 of the first mold portion 20 is separated or spaced apart from the top surface 22 of the second mold portion 30. As noted above, the first mold portion 20 and the second mold portion 30 may be operably coupled in a pivotal manner by a hinge member 52. Typically, one perimeter side wall 26 of the first mold portion 20 is connected with one perimeter side wall 36 of the second mold portion 30. It is further contemplated that the first mold portion 20 and the second mold portion 30 may be separate pieces that are moveably associated with one another.

Referring now to FIG. 3, the first mold portion 20 may also include one or more liquid circulating manifolds 54. These manifolds 54 are integrally formed in a body portion of the first mold portion 20 and are in fluid communication with at least one manifold inlet 62 and at least one manifold outlet 64. The manifold inlet 62 is adapted to provide liquid ingress into the at least one manifold 54 of the first mold portion 20 in order to warm the mold 10. The liquid circulating manifolds 54 are arranged adjacent to the concave depression 28 on the first mold portion 20. The manifolds 54 may have a variety of shapes including cylindrical, triangular, or any other shape that would allow for sufficient warming of the first mold portion 20. The manifolds 54 may be of any arrangement which allows bonds formed between an ice structure and the mold 10 to be broken in order to facilitate harvesting of the ice structure from the mold 10 including a plurality or liquid circulating structures 54 disposed adjacent to the concave depression of the first mold portion 20 as shown in FIG. 3. The manifold may also be a single manifold jacket 56 which is disposed adjacent to and generally follows the contours of the concave depression 28 of the first mold portion 20 as shown in FIG. 4. When the manifold 54 is a single manifold jacket 56, the first mold portion 20 may be comprised of a two-piece system having an upper mold portion 58 and a cavity side portion 60. The upper mold portion 58 of the first mold portion 20 includes the top surface 22 of the first mold portion 20 along with the perimeter side walls 26. The cavity side portion 60 of the first mold portion 20 includes the mold segment disposed between the manifold water jacket 56 and the concave depression 28. The liquid circulating manifold 54 is further adapted to receive a warm liquid medium in order to heat the first mold portion 20 and to release the at least one ice structure from the first portion 20 of the mold 10 while the mold 10 is in the open position 18.

As shown in FIGS. 1-4, the top surface 22 of the first mold portion 20 includes one or more apertures configured to receive an inlet 42 and an outlet 44. The inlet 42 is generally configured to allow liquid to pass through the top surface 22 of the mold 10 and down into the concave depression 28 of the first mold portion 20. The inlet 42 is typically coupled to an appliance or other liquid supplying device. Any excess liquid not frozen during the ice forming process is typically dispelled through the outlet 44, thereby providing continuous water movement or circulation within the mold cavity 40 during an ice formation process.

When forming an ice structure, the mold 10 generally begins in the ice forming, or closed position 16. Water is injected through the inlet 42 of the first mold portion 20 and into the mold cavity 40 and fills the mold cavity 40. Excess water is typically removed through the outlet 44 by water pressure, but water could also be removed from the mold cavity 40 by any known technique as one with ordinary skill in the art would use to remove excess water. The mold 10 is then cooled by using the evaporator 50 located in thermal communication with the bottom surface 34 of the second mold portion 30, but could be cooled by any other known technology such as thermoelectric cooling or cold air circulation. The first mold portion 20 and the second mold portion 30 of the present invention are configured to have different thermal conductivities. The second mold portion 30 is made from a substantially metallic material while the first mold portion 20 is comprised of a substantially polymeric or thermoplastic material. This allows for optimal freezing and releasing of the ice as formed in the mold cavity 40. Having the cooling device 50 disposed adjacent to the second mold portion 30, the portion with a higher thermal conductivity, allows the cooling device 50 to be used more efficiently to cool the mold 10 quickly. Having a first mold portion 20 with a lower thermal conductivity, allows for an ice removal process that is less susceptible to dimpling or cracking and allows the first mold portion 20 to be warmed in precise locations needed to efficiently and effectively remove the ice from the mold 10.

Once the ice structure is completely formed, the mold 10 is opened to an open position 18. The mold 10 can be opened at its hinge member 52 located on the perimeter side wall of each of the first and the second mold portions 26, 36, or the first mold portion 20 may be completely separated from the second mold portion 30. The first mold portion 20, while in the open position 18, is generally angled downward, which allows the formed icebody, or ice structure, to be gravitationally removed from the first mold portion 20. This also allows the ice structure to eject or release from the first mold portion 20 into an awaiting ice storage container, without interference from the second mold portion 30. Once the mold 10 is opened, warm liquid flows into the manifold inlet 62 in order to warm the plastic first mold portion 20. This heating effect helps to break any mechanical ice bonds formed between the ice structure and the first mold portion 20. The ice structure is then released down into the storage container.

The removal of the ice structure may occur in a variety of ways. First, the warm water may flow directly into the mold cavity 40 which melts the ice structure a small amount in order to break any mechanical ice bonds formed between the ice structure and the mold 10 to release the ice structure. This method can cause dents or other dimpling in the ice structure and is generally not preferred. Additionally, the warm water may be injected from the manifold inlet 62 into at least one manifold 54 which is disposed within a body portion of the first mold portion 20. These manifolds 54 are warmed by incoming water, or another thermal fluid, which ultimately warms the mold and breaks the bond between the ice structure and the plastic mold 20 and allows the ice structure to be released into the storage container. Moreover, the first mold portion 20 may include a manifold water jacket 56 which substantially surrounds the entire concave depression 28 of the first mold portion 20. Warm water, or another like warming medium, may be injected or otherwise released into this manifold water jacket 56 to warm the mold 10 and allow the bonds to break between the ice structure and the mold 10.

The first mold portion 20 of the mold 10 may further include an ejector pin mechanism 46 which extends from the top surface 22 of the first mold portion 20 and into the mold cavity 40. When the ice structure is ready to be removed from the mold 10, the ejector pin 46 is moved to an extended position within the mold cavity 40 and then applies a force on the formed ice structure to help release the ice structure and break the bond between the ice structure and the mold 10. The formed ice structures are then stored in a storage container where they are kept until they are dispensed or otherwise retrieved by the user.

Other variations and modifications can be made to the aforementioned structures and methods without departing from the concepts of the present disclosure. These concepts, and those mentioned earlier, are intended to be covered by the following claims unless the claims by their language expressly state otherwise.

What is claimed is:

1. A method of releasing ice from a mold apparatus, comprising the steps of:
    providing a mold apparatus having a first mold portion including a concave depression and a liquid circulating manifold and a second mold portion having a concave depression;
    positioning the liquid circulating manifold as a plurality of apertures adjacent to the concave depression of the first mold portion;
    pivotally coupling to the first mold portion to the second mold portion such that the mold apparatus is operable between an ice forming position and an ice harvesting position;
    assembling the mold apparatus to the ice forming position such that the concave depressions abut to from a mold cavity;
    injecting water into the mold cavity;
    cooling the mold apparatus;
    forming at least one ice structure within the mold cavity;
    circulating a warm liquid medium in the liquid circulating manifold to warm the mold apparatus;
    disassembling the mold apparatus to the ice harvesting position; and
    releasing the at least one ice structure from the mold apparatus.

2. The method of releasing ice from a mold apparatus of claim 1, further comprising the step of:
    forming the at least one ice structure such that the at least one ice structure is substantially clear.

3. The method of releasing ice from a mold apparatus of claim 1, further comprising the step of:
    forming the at least one ice structure such that the at least one ice structure is substantially spherical.

4. The method of releasing ice from a mold apparatus of claim 1, wherein the step of releasing the at least one ice structure from the mold apparatus further comprises the step of:
    ejecting the ice structure from the mold apparatus using an ejector pin.

5. The method of releasing ice from a mold apparatus of claim 1, further comprising the step of:
    flowing warm water as the warm liquid medium within the liquid circulating manifold.

6. A method of releasing ice from a mold apparatus, comprising the steps of:
    providing a mold apparatus having a first mold portion including a liquid circulating manifold and a second mold portion;
    forming the first mold portion of a material having a higher thermal conductivity than a material of the second mold portion;
    assembling the mold apparatus such that the first mold portion and the second mold portion are abuttingly engaged to create a mold cavity;
    injecting water into the mold cavity;
    cooling the mold apparatus;
    forming at least one ice structure within the mold cavity; and
    circulating a warm liquid medium in the liquid circulating manifold to warm the mold apparatus.

7. The method of releasing ice from a mold apparatus of claim 6, further comprising the step of:
    pivotally coupling to the first mold portion to the second mold portion such that the mold apparatus is operable between an ice forming position and an ice harvesting position.

8. The method of releasing ice from a mold apparatus of claim 6, further comprising the step of:
    ejecting the ice structure from the mold apparatus using an ejector pin.

9. The method of releasing ice from a mold apparatus of claim 6, further comprising the step of:
    forming the at least one ice structure such that the at least one ice structure is substantially clear.

10. The method of releasing ice from a mold apparatus of claim 9, further comprising the step of:
    forming the at least one ice structure such that the at least one ice structure is substantially spherical.

11. The method of releasing ice from a mold apparatus of claim 6, further comprising the step of:
    positioning the liquid circulating manifold as a plurality of apertures adjacent to a concave depression of the first mold portion.

12. A method of releasing ice from a mold apparatus, comprising the steps of:
    providing a mold apparatus having a first mold portion including a liquid circulating manifold and a second mold portion;
    forming the first mold portion of a material having a higher thermal conductivity than a material of the second mold portion;
    pivotally coupling the first mold portion to the second mold portion;
    assembling the mold apparatus such that the first mold portion and the second mold portion are abuttingly engaged to create a mold cavity;
    injecting water into the mold cavity;
    cooling the mold apparatus;
    forming at least one ice structure within the mold cavity;

circulating a warm liquid medium in the liquid circulating manifold to warm the mold apparatus;

disassembling the mold apparatus; and ejecting the ice structure from the mold apparatus using an ejector pin.

13. The method of releasing ice from a mold apparatus of claim 12, further comprising the step of:

forming the at least one ice structure such that the at least one ice structure is substantially clear.

14. The method of releasing ice from a mold apparatus of claim 13, further comprising the step of:

forming the at least one ice structure such that the at least one ice structure is substantially spherical.

15. The method of releasing ice from a mold apparatus of claim 14, further comprising the step of:

positioning the liquid circulating manifold as a plurality of apertures adjacent to a concave depression of the first mold portion.

16. The method of releasing ice from a mold apparatus of claim 15, further comprising the step of:

flowing warm water as the warm liquid medium within the liquid circulating manifold.

17. The method of releasing ice from a mold apparatus of claim 12, further comprising the step of:

positioning the liquid circulating manifold adjacent to the concave depression of the first mold portion.

* * * * *